United States Patent [19]

Steuer

[11] 3,722,308
[45] Mar. 27, 1973

[54] BEARING OF THE CONICAL DISCS OF AN INFINITELY VARIABLE CONE PULLEY TRANSMISSION

[75] Inventor: Herbert Steuer, Bad Homburg, Germany

[73] Assignee: Reimers Getriebe A.G., Zug, Switzerland

[22] Filed: Apr. 5, 1971

[21] Appl. No.: 131,171

[30] Foreign Application Priority Data

Apr. 4, 1970 Germany..................P 20 16 181.3

[52] U.S. Cl. ..........................................74/230.17 M
[51] Int. Cl..............................................F16h 11/06
[58] Field of Search ..............................74/230.17 M

[56] References Cited

UNITED STATES PATENTS

| | | | |
|---|---|---|---|
| 2,651,208 | 9/1953 | Karig | 74/230.17 M |
| 3,034,367 | 5/1962 | Steuer | 74/230.17 M |
| 3,190,135 | 6/1965 | Berens | 74/230.17 M |
| 3,224,287 | 12/1965 | Gesche et al. | 74/230.17 M |

*Primary Examiner*—C. J. Husar
*Attorney*—Jennings Bailey, Jr.

[57] ABSTRACT

On the driving and/or driven side of an infinitely variable cone pulley transmission the pulley discs are urged against a shoulder of the transmission shaft by the force of a helical coil spring exerted on the disc pair in axial direction. The annular surface of the shoulder which faces the cone discs and the annular surface of an extension of the hub of the cone disc which faces the shoulder are used as the bearing surfaces or races of a thrust bearing. The thrust bearing comprises roller elements mounted rotatably on a support ring and having the form of oblate spheroids. By this particular form the frictional sliding movement between the roller elements and the bearing surfaces, resulting from the wobble movement of the pulley disc, is turned into a purely rolling motion.

7 Claims, 5 Drawing Figures

INVENTOR
HERBERT STEUER

By applying oblate spheroids as the rolling members a significantly longer radius of the rolling motion is achieved than is possible with customary ball or roller bearings. This longer radius is achieved without making the transmission longer in the axial direction, only the diameter of the bearing may become slightly greater which, however, can be tolerated since in this radial direction sufficient space is available.

Decisive for the prevention of the formation of rust, however, is the hinge effect of the bearing according to the invention. This effect causes the spheroids to move within the play between the stud and the support ring in a rolling motion, substantially perpendicular to their own axis of rotation. The sliding movement occuring in the prior art transmissions between the rolling members and the bearing surfaces on account of the wobble movement of the cone discs is, thus, transformed into the mentioned rolling motion.

In order to facilitate this rolling motion the support ring may be made slightly convex transversely to the circumferential direction in the areas where the spheroids and the support ring are in contact.

It has proven particularly advantageous to make the radius of curvature of the spheroids longer than the radius of the circle along which the spheroids roll. This brings about a decrease of the Hertz surface pressure between the spheroids and the bearing surfaces.

For practical reasons and convenient manufacture the bearing surfaces or races are plane surfaces. However, they may also be slightly concave or convex in a direction transverse to the circumferential direction. If the radius of curvature of the spheroid is choosen appropriately the surface pressure may then remain constant.

If the bearing surface is made convex the roller members may have the shape of a cylinder instead of a spheroid.

In case the thrust bearing comprises only a few roller members, for example only two members, it has proven advantageous to provide the support ring with studs projecting in a radial inward direction for centering the ring relative to the shaft or to the extending hub portion.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

Figure 1:
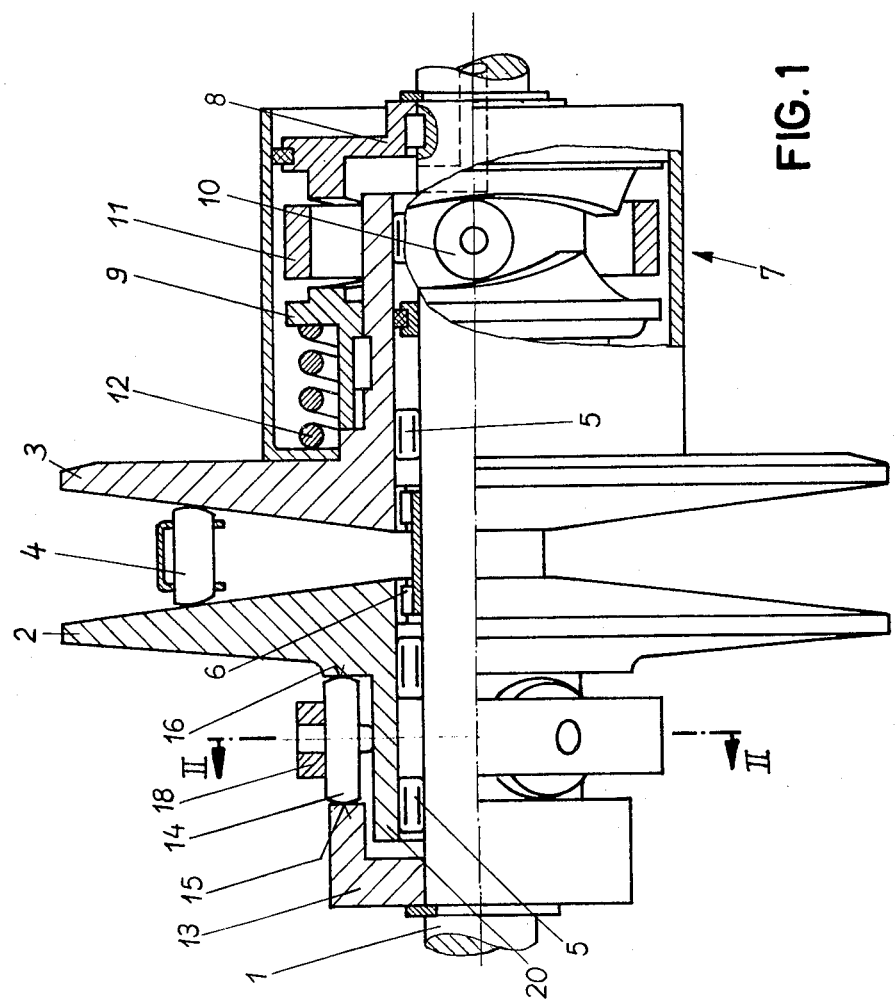
FIG. 1 shows a cone pulley pair of two cone discs of an infinitely variable cone pulley transmission, partially cut in axial direction.

Referring now to the drawings, FIG. 1 shows a cone pulley pair of an infinitely variable cone pulley transmission comprising two cone discs. The cone discs 2 and 3 are rotatably arranged on a shaft 1. Between them they support the transmitting element 4. The cone discs 2 and 3 are rotatable on the shaft by means of roller bearings 5 and they are in engagement with one another for joint rotation by means of a toothed sleeve 6 which is also rotatable on the shaft 1.

On the right-hand side of the cone disc 3 (FIG. 1) a pressure device 7 is arranged which establishes a connection for joint rotation of the cone discs 2 and 3 on the one hand and of the shaft 1 on the other hand. The pressure device 7 comprises a cam bushing 8 which is stationary on the shaft 1 and a cam element 9 in positive connection with the cone disc 3. Between the facing cams of the bushing 8 and the element 9 roller members 10 for load transmission are positioned. The roller members 10 are guided in a ring 11 by which they are also retained at equal distances from one another. A helical coil spring 12 ensures a proper contact between the cam bushing 8, the cam element 9, and the roller members 10, especially when a change in the direction of the torque occurs.

The force exerted in the axial direction on the cone discs 2 and 3 by the pressure device 7 is absorbed by the shaft 1 by means of a shoulder 13 on the shaft and by a thrust bearing consisting of this shoulder and of a bearing surface on the cone disc 2 and of roller members 14 between the shoulder and the bearing surface. The bearing surface on the shoulder 13 is denoted 15 and the bearing surface on the cone disc 2 is marked 16.

Figure 2:
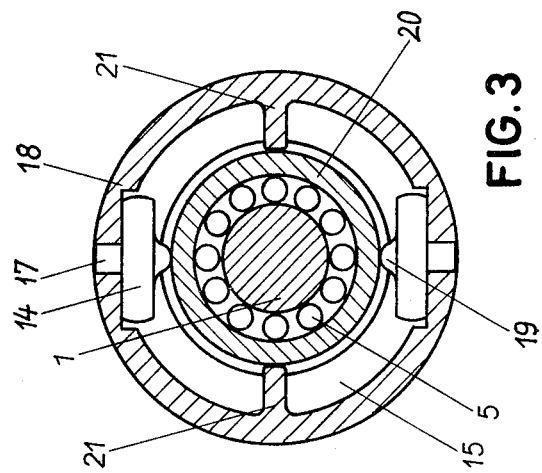
FIG. 2 is a sectional view of the transmission, cut along the line II—II in FIG. 1.
Figure 3:
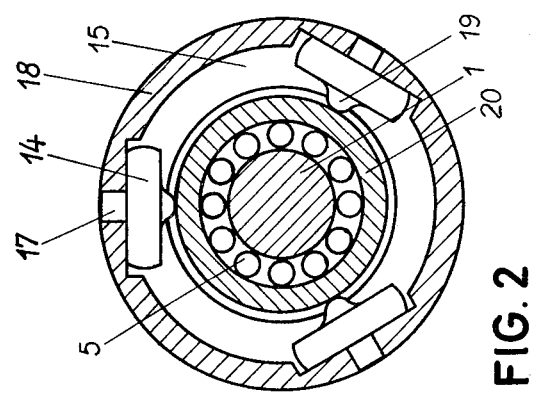
FIG. 3 shows a second embodiment of the roller elements and the support ring.

In the embodiments shown in the FIGS. 2 and 3 the roller members 14 are pivotably guided in a support ring 18 by means of a trunnion 17 projecting from the roller members in a radially outward direction relative to the shaft 1. The unit comprising the support ring 18 and the roller members 14 is centered relative to the shaft by means of studs 19 which project from the roller members 14 in a radially inward direction and which bear against the extending portion of the hub of the cone disc 2.

If the thrust bearing comprises only two roller members 14, as shown in FIG. 3, it will be of advantage to provide the support ring 18 with additional studs 21 for centering the device relative to the hub 20.

Figure 4:
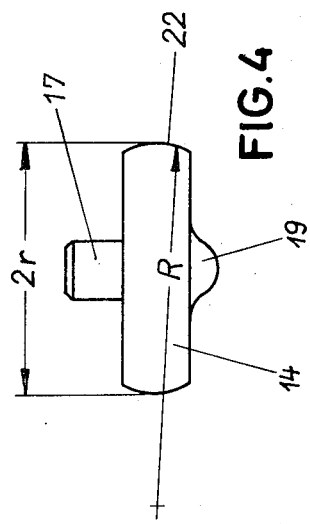
FIG. 4 shows the invented roller element on an enlarged scale.

FIG. 4 is an enlarged illustration of a roller member 14. As can clearly be seen, the rolling surfaces 22 are sections of the Polar Arcs of an oblate spheroid of which the radius R is longer than the outer diameter $2r$ of the member.

Figure 5:
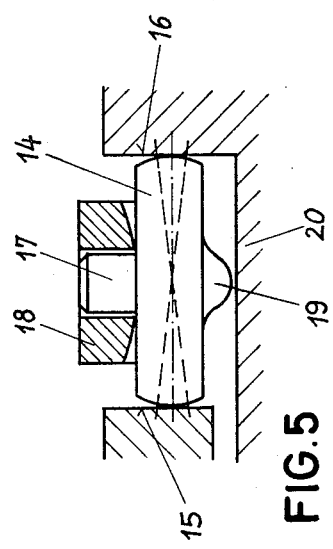
FIG. 5 shows a sectional view of another embodiment of the support ring of FIG. 1 on an enlarged scale.

From FIG. 5 will readily be understood the manner in which the roller members may tilt. In order to make this very clear the oblique positions which the roller members may occupy are indicated by the dotted lines and the clearance of the bearing and the convex cross section of the support ring are exaggerated.

An application of roller members 14 of the type shown in the FIGS. 1 – 5 in connection with the particular form of the bearing surfaces 15 and 16 and the centering of the bearing by means of the studs 19 and 21 makes possible a tilting motion of the roller members in the support ring 18 and relative to the bearing surfaces 15 and 16, which tilting motion may be caused by the wobble movement of the cone disc 2 under the rotating load. The advantage of this particular shape of the roller members over the prior art is that even when the roller members tilt in one direction or the other

BEARING OF THE CONICAL DISCS OF AN INFINITELY VARIABLE CONE PULLEY TRANSMISSION

BACKGROUND OF THE INVENTION

The present invention pertains to infinitely variable cone pulley transmissions. More particularly it pertains to the bearing of the cone discs in such a transmission.

Transmissions of this type comprise on the driving and on the driven shaft at least one cone disc which is stationary in axial direction and one cone disc which is movable in the axial direction. Each cone disc has a portion of the hub extending to one side and both hubs are interconnected for joint revolution. Between the shaft and the cone discs there is provided a roller bearing or a ball bearing for absorbing the radial forces during rotation, and between the extended portion of the hub of one cone disc and a shoulder on the shaft there is arranged a thrust bearing for absorbing the forces in axial direction. The cone discs are coupled to the shaft by means of elements which exert a pressure in dependence on the torque and/or the transmission ratio.

Cone disc bearings of the above type are already disclosed in the French Pat. No. 1,523,933. However the thrust bearing in such transmissions still presents problems. The thrust bearing, as well as the roller bearing, are only required because the position of the cone disc relative to the shaft changes during each variation of the transmission ratio and also when the torque transmitted by the transmitting element varies. When this occurs the cams which are parts of the pressure device and which face one another also change their position relative to one another in order to adjust themselves to the new working conditions, and this causes the cone discs to shift in a circumferential direction on the shaft.

The mentioned problems result from the fact that in a rotating transmission the roller bearings undergo a "rotating" load. The pull exerted on the pulley pair by the transmitting belt is constantly effective in the direction of the other pulley pair and, since the cone discs rotate relative to this constant direction of pull, the effect is the same as if the load would rotate relative to the bearing.

This is even more of a disadvantage, because in most rotating transmissions the roller bearings are at rest because the transmission rotates under a fixed torque and with a fixed transmission ratio, and also because the pull of the transmitting belt causes the shaft to bend slightly in the direction of the other pulley pair as a consequence whereof only a small portion of the roller bearing actually bears the load.

From these conditions corrosion and the formation of rust in the bearings result which eventually leads to a working-in of the roller elements into the bearing surfaces. Up to now this could not even be prevented by additional means and measures such as forced lubrication and/or forced rotation of the roller elements.

The disclosure of the French Pat. No. 1,523,933 teaches a way overcome this disadvantage by mounting at least the stationary cone disc by means of two bearings on the shaft, of which bearings at least one is an angular contact bearing which absorbs both axial and radial forces and which makes it possible to support the cone disc on the shaft without play. In practice, however, it has turned out that not all problems can be solved in a this manner.

Another attempt to solve the existing problem is disclosed in the German Pat. No. 1,124,774. The stationary cone disc in this publication has no extended portion of the hub and is connected to the hub by means of a support disc which has about the diameter of the cone disc itself. The bearing between the cone disc and the support disc is accomplished either by a roller bearing and a separate thrust bearing arranged between plane bearing surfaces which extend perpendicularly to the shaft, or by an angular contact ball bearing. However, the device according to the German Patent is a special type, designed to have a minimum of length in axial direction and a minimum of weight. To this end considerable expenses in production are tolerated which are caused by the fact that the two cone discs in one pulley pair are not of the same form and by the support disc which is additionally required. Therefore, if only average duty is expected from the cone pulley transmission cone discs having extended hub portions are to be preferred.

By further extensive tests it has now been found that the cone disc performs a wobble movement which results from the superimposition of a tilting motion and a purely rotatory motion which the cone disc undergoes during transmission operation. This wobble movement causes a slight sliding motion between the rolling elements and the bearing surfaces especially in those bearings which are only designed for rolling movements in circumferential direction. On account of the sliding motion the rolling elements, such as rollers or balls, work their way into the bearing surfaces, thereby forming shoulders on either of their sides on the bearing surfaces. After the rolling elements have worked into the surfaces it is impossible or almost impossible to change the transmission ratio because the rolling elements are held in the groove between the shoulders in the bearing surfaces. The relative displacement between the cone disc and the shaft in the axial direction which is necessary for a change of the transmission ratio either cannot be performed at all or only by a strong force which leads to a jerking change in the transmission ratio.

It is, therefore, an object of the present invention to provide an infinitely variable cone pulley transmission which is free from the wear which occurs in the prior art transmissions on account of the slight sliding motion between the rolling elements and the bearing surfaces, and which is further free from the rust and the corrosion appearing in such bearings.

SUMMARY OF THE INVENTION

The above stated object is attained by a thrust bearing which comprises two annular bearing surfaces which extend perpendicularly to the shaft axis. Between the bearing surfaces are inserted at least two rolling elements at equal angular spaces from one another. The rolling elements are oblate spheroids which are rotatably mounted in a support ring by means of a stud extending in the radial outward direction and which, together with the support ring, are centered relative to the shaft or relative to the extending portion of the hub of the stationary disc by means of another stud projecting from the face of the spheroids in a radial inward direction.

they still roll along the bearing surfaces and do not slide or jam. By this tilting motion the sliding motion which occurs in transmissions of the prior art is thus overcome. Even during a longer period of operation of the transmission during which a constant torque is transmitted at a constant transmission ratio, i.e., when the thrust bearing is at a stand-still relative to the shaft 1 and to the cone disc 2, no corrosion or rust will form and no working-in of the roller members in the bearing surfaces will occur.

What is claimed is:

1. In an infinitely variable cone pulley transmission which comprises driving and driven shafts and two cone discs one on each of said shafts, one of which is stationary and the other movable in the axial direction, said shaft having means forming a shoulder thereon facing the outer side of the stationary disc, the stationary disc having a shoulder thereon facing the shaft shoulder, resilient means acting on the discs and urging them towards the shaft shoulder, said shoulders forming a first pair of annular bearing surfaces extending around the shaft, a support ring arranged between the planes of the bearing surfaces and having radially inwardly directed bores therein, a plurality of roller members engaged between the bearing surfaces and having trunnions projecting outwardly therefrom and engaged in said bores, the opposite sides of said roller members each forming a second pair of bearing surfaces which engage the first pair of bearing surfaces, the surfaces of one of said pairs being convexly curved about axes perpendicular to radial planes through the axes of the trunnions, the other pair of bearing surfaces lying substantially in planes perpendicular to the shaft axis, one of said stationary disc and said shaft having a cylindrical surface portion opposite said ring, and said roller members having studs projecting therefrom opposite the cylindrical surface portion, whereby to limit inward movement of the roller members.

2. In a device as claimed in claim 1, the surfaces of the second pair being convexly curved and formed in cross-section as polar arcs of an oblate spheroid.

3. In a device as claimed in claim 2, roller bearings supporting said discs on the shafts.

4. In a device as claimed in claim 1, the surfaces of the second pair of bearing surfaces being convex and said first pair of bearing surfaces being cylindrical.

5. In a device as claimed in claim 4, roller bearings supporting said discs on the shafts.

6. In a device as claimed in claim 1, said support ring having inwardly projecting parts engageable with said cylindrical surface portion for centering the ring.

7. In a device as claimed in claim 1, the inner surface of the support ring adjacent the bores being convexly curved.

* * * * *